(12) United States Patent
Motomura et al.

(10) Patent No.: US 10,160,322 B2
(45) Date of Patent: Dec. 25, 2018

(54) HEAD-UP DISPLAY DEVICE

(71) Applicant: DENSO CORPORATION, Kariya, Aichi-pref. (JP)

(72) Inventors: Hirohisa Motomura, Kariya (JP); Yasuhiko Niimi, Kariya (JP); Ryo Yamaoka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/551,063

(22) PCT Filed: Feb. 24, 2016

(86) PCT No.: PCT/JP2016/055397
§ 371 (c)(1),
(2) Date: Aug. 15, 2017

(87) PCT Pub. No.: WO2016/158100
PCT Pub. Date: Oct. 6, 2016

(65) Prior Publication Data
US 2018/0093567 A1  Apr. 5, 2018

(30) Foreign Application Priority Data

Apr. 1, 2015 (JP) .................................. 2015-075288

(51) Int. Cl.
*B60K 37/02* (2006.01)
*B60K 35/00* (2006.01)
*G02B 27/01* (2006.01)

(52) U.S. Cl.
CPC .............. *B60K 37/02* (2013.01); *B60K 35/00* (2013.01); *G02B 27/0149* (2013.01);
(Continued)

(58) Field of Classification Search
CPC ................ G02B 27/0101; G02B 27/01; G02B 2027/014; G02B 27/0149;
(Continued)

(56) References Cited

U.S. PATENT DOCUMENTS 6,402,321 B1 * 6/2002 Harter, Jr. .......... G02B 27/0101
345/7
2009/0261612 A1 * 10/2009 Takayama .............. B60K 37/02
296/70

(Continued)

FOREIGN PATENT DOCUMENTS

JP   H06008748 A    1/1994
JP   2010134058 A   6/2010
(Continued)

*Primary Examiner* — Koosha Sharifi-Tafreshi
(74) *Attorney, Agent, or Firm* — Harness, Dickey & Pierce, P.L.C.

(57) ABSTRACT

A head-up display device includes a display unit that projects a display image to a windshield of a vehicle; a control board that has a control circuit, which controls the display unit; and a housing case that receives the control board and has a hollow space, which is in contact with the control board. The display unit is placed at an outside of the housing case. The housing case includes a communication passage that communicates between a duct and the hollow space while the duct conducts air, which is blown from an air conditioning device of the vehicle toward a vehicle cabin.

18 Claims, 8 Drawing Sheets

(52) U.S. Cl.
CPC .. *B60K 2350/2052* (2013.01); *B60K 2350/30* (2013.01); *B60K 2350/35* (2013.01); *B60K 2350/401* (2013.01); *G02B 2027/0161* (2013.01)

(58) Field of Classification Search
CPC .... G02B 2027/0118; G02B 2027/0138; G02B 2027/011; G02B 2027/0141; B60K 35/00; B60K 2350/2052; B60K 2350/1072; B60K 37/00; B60K 37/02; B60K 2350/401; B60R 11/0229; B60R 2300/205; B60H 1/00; G03B 21/16
See application file for complete search history.

(56) References Cited

U.S. PATENT DOCUMENTS

2014/0293239 A1* 10/2014 Shimizu ............. G02B 27/0149
353/52
2016/0039389 A1 2/2016 Kato et al.

FOREIGN PATENT DOCUMENTS

| JP | 2013082398 A | 5/2013 |
| JP | 2014210564 A | 11/2014 |

\* cited by examiner

HEAD-UP DISPLAY DEVICE

CROSS REFERENCE TO RELATED APPLICATIONS

This application is a U.S. National Phase Application under 35 U.S.C. 371 of International Application No. PCT/JP2016/055397 filed on Feb. 24, 2016 and published in Japanese as WO 2016/158100 A1 on Oct. 6, 2016. This application is based on and claims the benefit of priority from Japanese Patent Application No. 2015-075288 filed on Apr. 1, 2015. The entire disclosures of all of the above applications are incorporated herein by reference.

CROSS REFERENCE TO RELATED APPLICATION

This application is based on and incorporates herein by reference Japanese Patent Application No. 2015-75288 filed on Apr. 1, 2015.

TECHNICAL FIELD

The present disclosure relates to a head-up display device that includes a display unit, which projects a display image.

BACKGROUND ART

Previously, various types of head-up display devices have been proposed. In these head-up display devices, a display light, which is outputted from a display unit, is reflected by a reflecting mirror and is projected to a front glass, so that a driver of the vehicle visually recognizes a display image that is superimposed on a scene at a front side of the vehicle. In the head-up display devices described above, particularly under a high temperature environment, there are disadvantages, such as damaging of the display unit caused by heating, a requirement of a long time period (e.g., one hour or longer) until a brightness of the display unit is sufficiently increased since the time of starting the operation. In order to address the above disadvantages, there has been proposed a head-up display device that includes a cooling fan as a cooling means for cooling the display unit that generates the display light. One such a device is disclosed in the patent literature 1.

CITATION LIST

Patent Literature

PATENT LITERATURE 1: JP2010-134058A

SUMMARY OF INVENTION

However, as a result of thorough consideration of the inventors of the present application, it has been noted that in the case of the device recited in the patent literature 1, which cools the control circuit by using the cooling fan, since there is required a space for accommodating the cooling fan as well as an electric motor that drives the cooling fan, a size of the device is disadvantageously increased, thereby resulting in an increase in the costs.

Furthermore, in the device recited in the patent literature 1, since the cooling air is directly applied to the display unit, there is a high possibility of adhering of dust to the display unit. Therefore, in this device, when the dust adheres to the display unit, an image of the dust may be projected over the display image that is displayed at the front glass.

The present disclosure is made in view of the above disadvantages, and it is an objective of the present disclosure to reduce a possibility of projecting an image of dust over a display image and to cool a control circuit, which controls a display unit, without providing a cooling fan.

In order to achieve the above objective, according to one aspect of the present disclosure, a head-up display device includes: a display unit that projects a display image to a windshield of a vehicle; and a control board that has a control circuit, which controls the display unit. Furthermore, the head-up display device includes a housing case that receives the control board and has a hollow space, which is in contact with the control board. The display unit is placed at an outside of the housing case. The housing case includes a communication passage that communicates between: a duct that conducts air, which is blown from an air conditioning device of the vehicle toward a vehicle cabin; and the hollow space.

By using the head-up display device described above, the control circuit, which controls the display unit, can be cooled without providing the cooling fan. Furthermore, in this head-up display device, since the display unit is placed at the outside of the housing case, it is possible to reduce a possibility of projecting an image of the dust over the display image.

Furthermore, according to another aspect of the present disclosure, a head-up display device includes: a display unit that projects a display image to a windshield of a vehicle; a control board that has a control circuit, which controls the display unit; and a housing case that has a hollow space, which is in contact with the control board. The display unit is placed at an outside of the housing case. The control board is placed such that the control board contacts the housing case at the outside of the housing case. The housing case includes a communication passage that communicates between: a duct that conducts air, which is blown from an air conditioning device of the vehicle toward a vehicle cabin; and the hollow space. Even with this head-up display device, it is possible to cool the control circuit, which controls the display unit, without providing the cooling fan. Furthermore, in this head-up display device, since the display unit is placed at the outside of the housing case, it is possible to reduce a possibility of projecting an image of the dust over the display image.

It should be noted that the reference signs in parentheses for the respective means in this section and claims show a relationship to the specific means recited in the embodiments described later.

DESCRIPTION OF EMBODIMENTS

Figure 1:
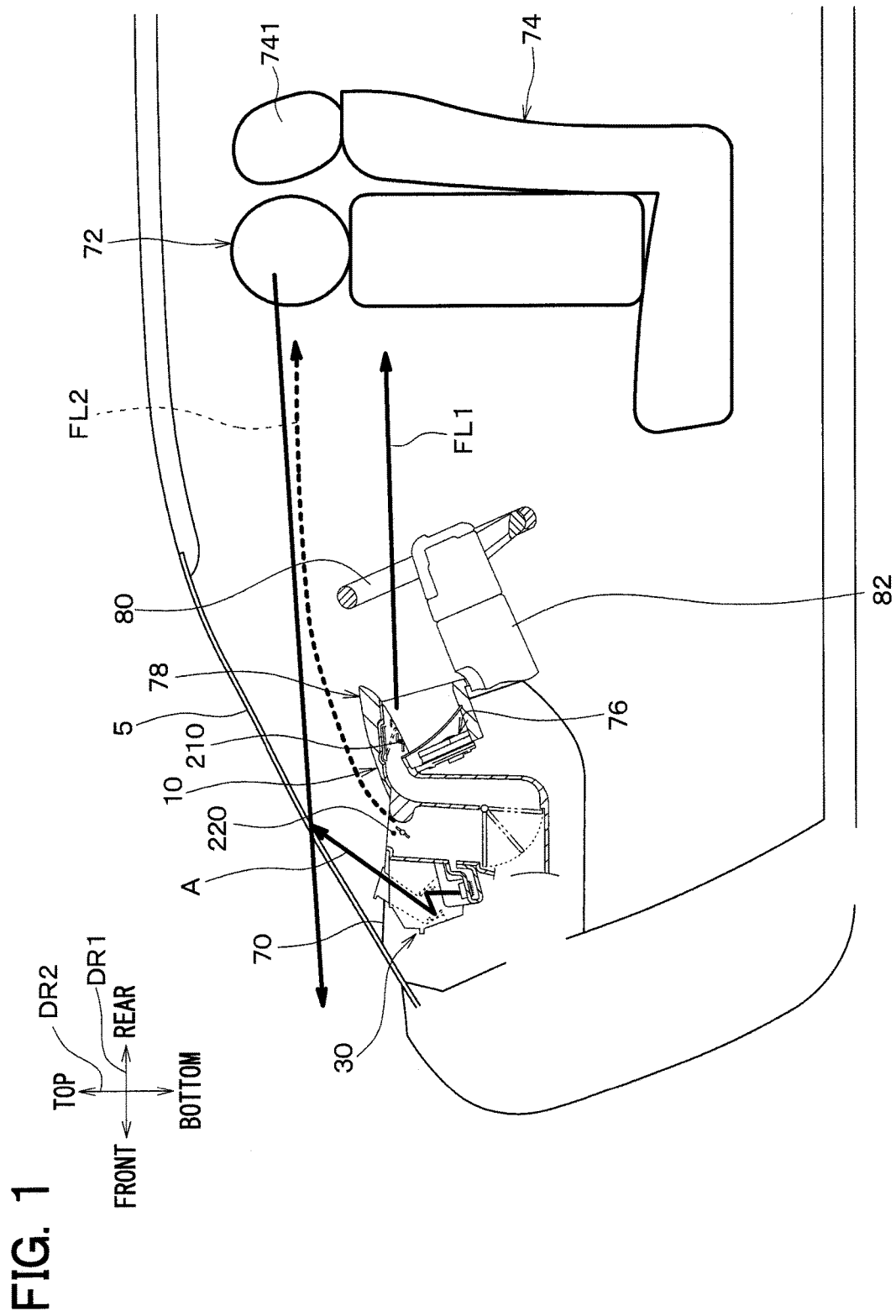
FIG. 1 is a schematic view showing arrangement of a head-up display device and an air discharging device in a vehicle cabin according to a first embodiment of the present disclosure.

A head-up display device 30 according to a first embodiment of the present disclosure will be described with reference to the accompanying drawings. FIG. 1 is a schematic view showing arrangement of the head-up display device 30 and an air discharging device 10 in a vehicle cabin according to the embodiment of the present disclosure. As shown in FIG. 1, the air discharging device 10 is used as discharge outlets as well as a portion of a duct of an air conditioning device 90 that is installed at, for example, a vehicle front side of a vehicle cabin. The air conditioning device 90 is an air conditioning unit.

The head-up display device 30 and the air discharging device 10 are installed to an instrument panel 70. Similar to an ordinary vehicle, the instrument panel 70 is placed at the vehicle front side in the vehicle cabin, and a driver seat 74, on which a driver 72 is seated, is placed on a vehicle rear side of the instrument panel 70 in the vehicle cabin. An arrow DR1 of FIG. 1 indicates a vehicle front-to-rear direction DR1. Furthermore, an arrow DR2 indicates a vehicle vertical direction, i.e., a vehicle top-to-bottom direction DR2. Additionally, an arrow DR3 of FIG. 2 described later indicates a vehicle left-to-right direction DR3, i.e., a vehicle widthwise direction DR3. These three directions DR1, DR2, DR3 are directions that are perpendicular to each other.

The head-up display device 30 is placed in an inside of the instrument panel 70 on a vehicle front side of the air discharging device 10. The head-up display device 30 projects a display image, which contains various information for driving support, from the inside of the instrument panel 70 toward a front glass 5, as indicated by an arrow A in FIG. 1. The front glass is a windshield 5. The driver recognizes this image as if the image is displayed ahead of the front glass 5. When the driver sees the image superimposed on a scene at the front side of the vehicle, the driver can obtain the various information without substantially moving a line of sight.

Figure 2:
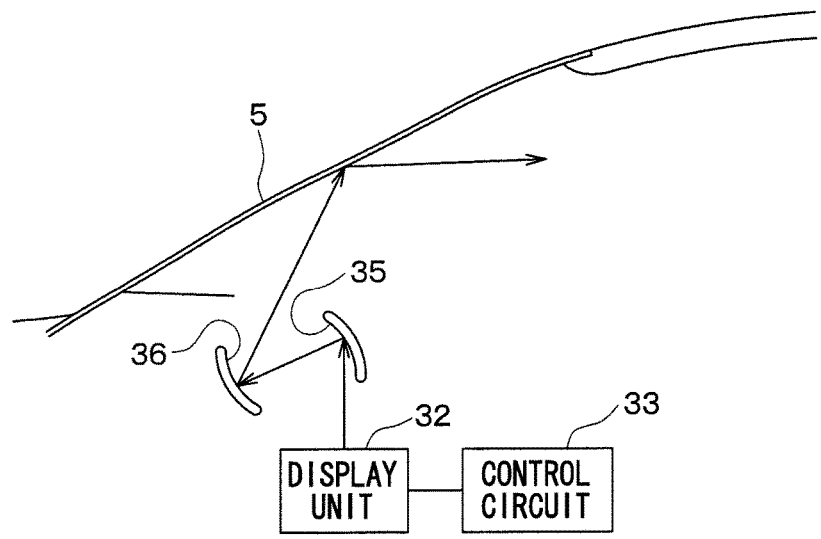
FIG. 2 is a diagram showing a structure of the head-up display device shown in FIG. 1.

FIG. 2 is a diagram showing a structure of the head-up display device 30. The head-up display device 30 includes a display unit 32, a control circuit 33, a magnifying mirror 35 and a magnifying mirror 36.

Figure 4:
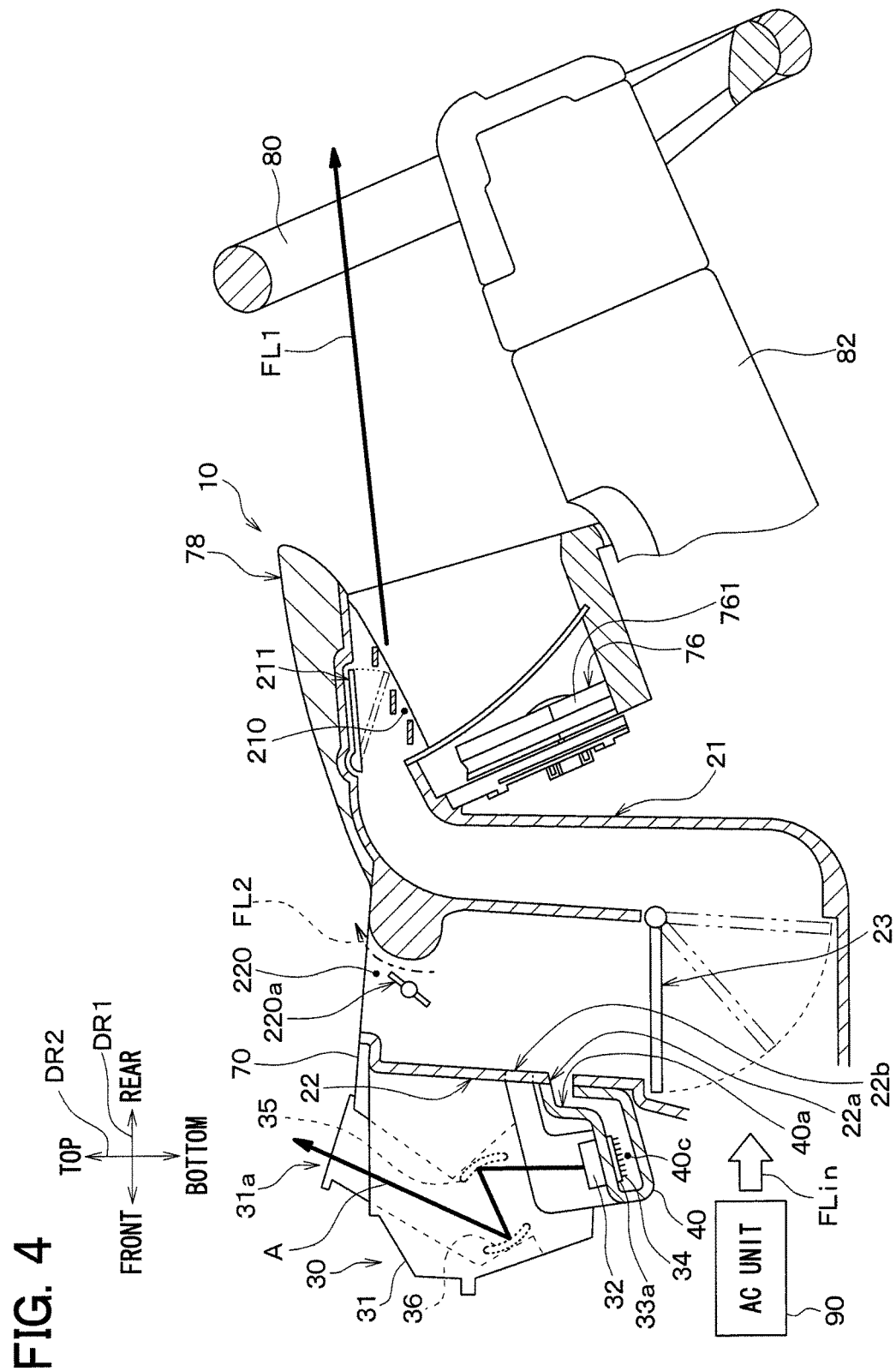
FIG. 4 is a partial enlarged view of FIG. 1 indicating a structure of the head-up display device, the air discharging device and an area around these devices.

The control circuit 33 outputs information, which is used to control the display unit 32, to the display unit 32. The control circuit 33 is installed to a control board 33a that is shown in FIG. 4 and will be described later. The control circuit 33 executes various processes. For instance, the control circuit 33 generates image information to be displayed on a liquid crystal display element of the display unit 32 based on various information, such as current location information and vehicle speed information, and a signal, which is inputted to the control circuit 33 through an operation device installed in the vehicle cabin, and the control circuit 33 outputs thus generated image information to the liquid crystal display element of the display unit 32.

The display unit 32 projects the display image. The display unit 32 is formed by a liquid crystal display device that includes the liquid crystal display element and a light source that projects light to the liquid crystal display element from a back side of the liquid crystal display element. When the light is projected from the light source to the liquid crystal display element from the back side of the liquid crystal display element, the projected light passes through the liquid crystal display device and enters the magnifying mirror 35.

The magnifying mirror 35 reflects the projected display image, i.e., the projected light, which is projected from the display unit 32, so that the projected display image is magnified and enters the magnifying mirror 36. The magnifying mirror 35 is placed at a location where the display image, i.e., the light, which is outputted from the display unit 32, enters. The magnifying mirror 35 is formed by a concave mirror that is referred to as a magnifier mirror.

The magnifying mirror 36 reflects the display image, i.e., the light, which is inputted from the magnifying mirror 35 to the magnifying mirror 36, so that the reflected display image, which is reflected by the magnifying mirror 36, is magnified and enters the front glass 5. The magnifying mirror 36 is placed at a location where the display image, i.e., the light, which is outputted from the magnifying mirror 35, enters. The magnifying mirror 36 is formed by a concave mirror that is referred to as a magnifier mirror.

The display image, which is projected from the display unit 32, enters the magnifying mirror 35 and is magnified by the magnifying mirror 35. Furthermore, the display image, which is magnified by the magnifying mirror 35, enters the magnifying mirror 36, and this display image is magnified by the magnifying mirror 36 and is projected to the front glass 5 by the magnifying mirror 36.

Figure 3:
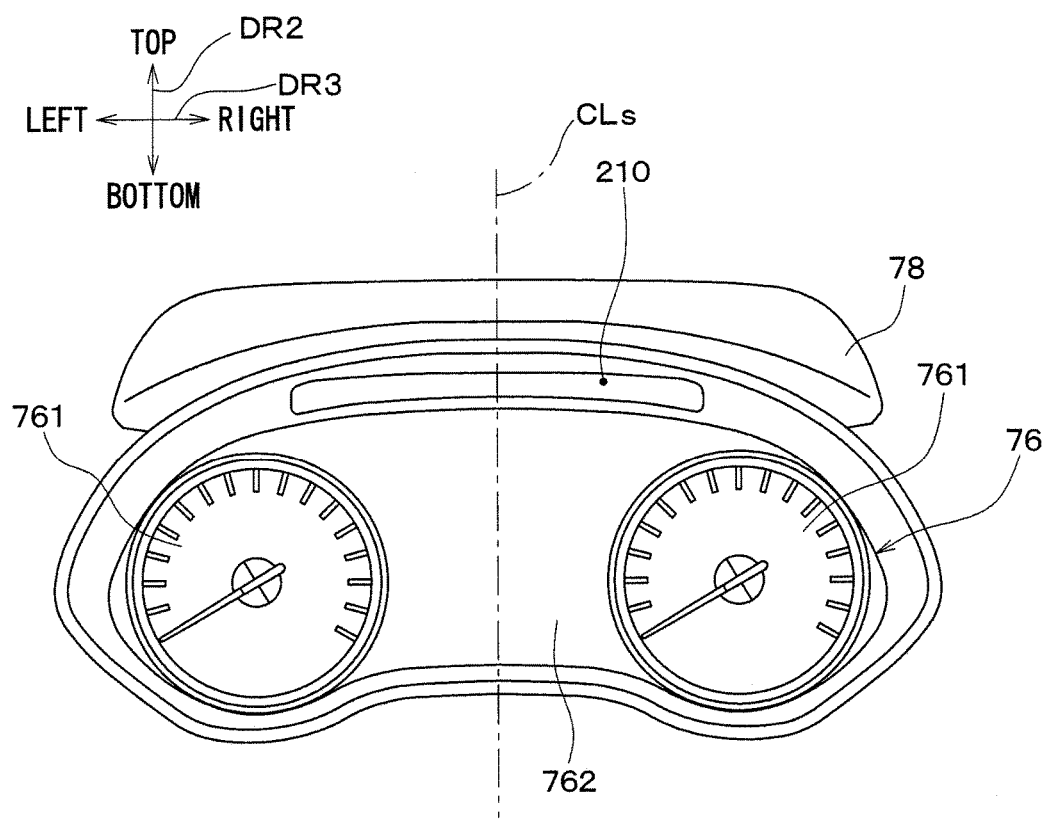
FIG. 3 is a diagram indicating a meter panel and a meter hood of the head-up display device of FIG. 1 viewed by a driver in a driving position while a steering wheel is eliminated for the sake of simplicity.

Next, the structure of the air discharging device 10 will be described. As shown in FIG. 3, the air discharging device 10 includes a meter panel 76, which has meters 761, and a meter hood 78, which covers an upper side of the meter panel 76. The meters 761 may be respectively formed as, for example, a speed meter or a tachometer. FIG. 3 is a diagram indicating the meter panel 76 and the meter hood 78 viewed by the driver 72 in a driving position while a steering wheel 80 is eliminated for the sake of simplicity.

Besides the two meters 761, the meter panel 76 has a meter periphery 762, which is a portion around the meters 761. The meter panel 76 is arranged such that when the meter panel 76 is viewed from the driver seat 74 side, the two meters 761 and the meter periphery 762 can be viewed.

The meter hood 78 is placed such that the meter hood 78 extends in the vehicle widthwise direction DR3 at a location that is on an upper side of the meter panel 76, i.e., a vehicle upper side of the meter panel 76.

As shown in FIG. 1, the meter panel 76 and the meter hood 78 are placed on the front side of the driver seat 74 in the vehicle cabin, i.e., are placed on the vehicle front side of the driver seat 74. Furthermore, a steering column 82 projects from a lower side of the meter panel 76 at the instrument panel 70 toward the driver seat 74. The steering wheel 80 is installed to a distal end of the steering column 82.

FIG. 4 is a detailed partial enlarged view showing the air discharging device 10 and constituent components located around the air discharging device 10 shown in FIG. 1. FIG. 4 is a cross sectional view showing a cross section of the air discharging device 10, the steering wheel 80 and the housing case 40, which is taken in a direction perpendicular to the vehicle widthwise direction DR3 shown in FIG. 3.

As shown in FIG. 4, the air discharging device 10 is a device that discharges the blown air outputted from the air conditioning unit 90. That is, the air conditioning unit 90 functions as an air blowing device that outputs the air to the air discharging device 10. The air conditioning unit 90 is a known device that is placed in the inside of the instrument panel 70 shown in FIG. 1 and discharges the temperature adjusted conditioning air toward the inside of the vehicle cabin. For example, the air conditioning unit 90 is similar to a cabin air conditioning unit disclosed in JP2013-082398A.

The air discharging device 10 includes a first discharge outlet 210, a first discharge outlet door 211, a first duct 21, a second discharge outlet 220, a second duct 22 and an air flow quantity adjusting door 23. The first discharge outlet 210 discharges the blown air that is outputted from the air conditioning unit 90. The first discharge outlet 210 functions as a face discharge outlet that discharges the cooled air, which is cooled by the air conditioning device 90, toward, for example, a face of the occupant. The second discharge outlet 220 functions as a face opening portion that discharges the cooled air, which is cooled by the air conditioning device 90, toward, for example, a face of an occupant on a rear seat after flowing through a space above a head of the occupant on the driver seat.

The first discharge outlet 210 is formed integrally with the meter hood 78. The first discharge outlet 210 opens such that the first discharge outlet 210 discharges the blown air, which is outputted from the air conditioning unit 90, toward the vehicle rear side. Specifically, the first discharge outlet 210 opens on the lower side of the meter hood 78.

Furthermore, the first discharge outlet 210 opens such that the first discharge outlet 210 discharges the blown air, which is outputted from the air conditioning unit 90, toward the vehicle rear side through an inner side of the steering wheel 80, as indicated by an arrow FL1. The arrow FL1 indicates a main flow of the blown air, which is discharged from the first discharge outlet 210. In the present embodiment, it is only required that the main flow of the blown air reaches the driver through the inner side of the steering wheel 80, and thereby it is not required that all of the blown air passes through the inner side of the steering wheel 80.

The first discharge outlet door 211 adjusts a discharge direction of the air, which is discharged from the first discharge outlet 210. The flow direction of the air, which is discharged from the first discharge outlet door 211, is variable depending on a direction of the first discharge outlet door 211. The first discharge outlet door 211 is moved through electric control executed by an electronic control device.

The first duct 21 guides the blown air, which is outputted from the air conditioning unit 90, to the first discharge outlet 210. That is, the air, which is discharged from the first discharge outlet 210 into the vehicle cabin, is introduced to the first discharge outlet 210 through the first duct 21.

Figure 5:
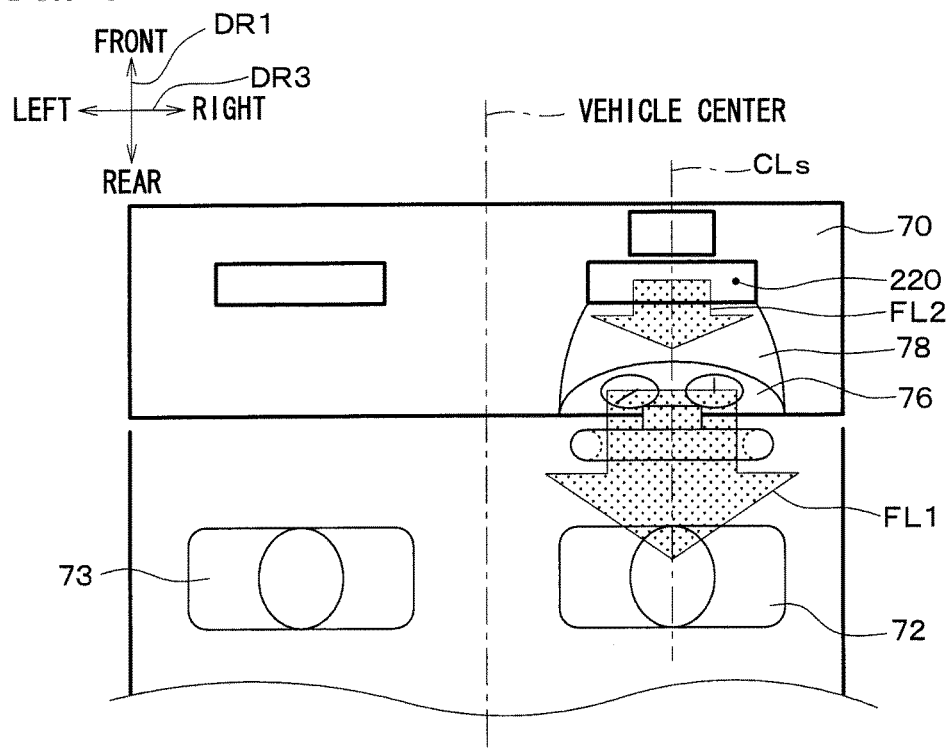
FIG. 5 is a schematic view of a vehicle front side portion of the vehicle cabin seen from a top side of the vehicle according to the first embodiment of the present disclosure.

The second discharge outlet 220 is an air discharge portion that discharges the blown air, which is outputted from the air conditioning unit 90, in parallel with the first discharge outlet 210. Specifically, as shown in FIG. 5, the second discharge outlet 220 discharges the blown air in a direction that is generally the same as that of the blown air discharged from the first discharge outlet 210. The second discharge outlet 220 is formed integrally with the first discharge outlet 210 as a one-piece body and is placed on the vehicle front side of the first discharge outlet 210. The second discharge outlet 220 opens upward at a top surface of the instrument panel 70 of the vehicle and is placed on the vehicle front side of the first discharge outlet 210.

The second discharge outlet 220 changes a flow direction of the air, which is discharged into the vehicle cabin, according to a principle that is similar to the principle of the air discharging device recited in JP2014-210564A. Specifically, the second discharge outlet 220 changes the flow of the air, which is discharged from the second discharge outlet 220, toward the vehicle rear side through use of the Coanda effect.

Furthermore, the second discharge outlet 220 has a second discharge outlet door 220a. The second discharge outlet door 220a adjusts the flow of the air, which is discharged from the second discharge outlet 220. The second discharge outlet door 220a is moved through electric control executed by the electronic control device.

The second duct 22 guides the blown air, which is outputted from the air conditioning unit 90, to the second discharge outlet 220. That is, the air, which is discharged from the second discharge outlet 220 into the vehicle cabin, is introduced to the second discharge outlet 220 through the second duct 22. The second duct 22 is placed at a location, which is on the vehicle front side of the first duct 21 and is on the vehicle rear side of a casing 31 of the head-up display device 30.

The air flow quantity adjusting door 23 is an air flow quantity adjusting device that adjusts an air flow quantity ratio between a flow quantity of the air, which is introduced to the first duct 21, and a flow quantity of the air, which is introduced to the second duct 22. The air flow quantity adjusting door 23 is placed at a connecting point, at which the first duct 21 and the second duct 22 are connected with each other.

FIG. 5 is a schematic view of the vehicle front side portion of the vehicle cabin seen from the top side of the vehicle according to the present embodiment. As shown in FIG. 5, a main flow of the blown air, which is discharged from the first discharge outlet 210, flows through the inner side of the steering wheel 80 and reaches the driver, as indicated by an arrow FL1. Furthermore, a main flow of the blown air, which is discharged from the second discharge outlet 220, flows in parallel with the main flow of the blown air, which is discharged from the first discharge outlet 210, as indicated by an arrow FL2.

As shown in FIG. 4, the head-up display device 30 of the present embodiment includes the casing 31, the display unit 32, the control board 33a, which has the control circuit 33 shown in FIG. 2, and the housing case 40, which receives the control board 33a and the heat sink fins 34. The heat sink fins 34 are projections, which are formed at the control board 33a to release the heat of the control board 33a.

The casing 31 is a member that receives the magnifying mirror 35 and the magnifying mirror 36. The casing 31 and the housing case 40 are respectively made of resin (e.g., polypropylene). The housing case 40 is formed separately from the casing 31. The housing case 40 is formed separately from the second duct 22.

Figure 6:
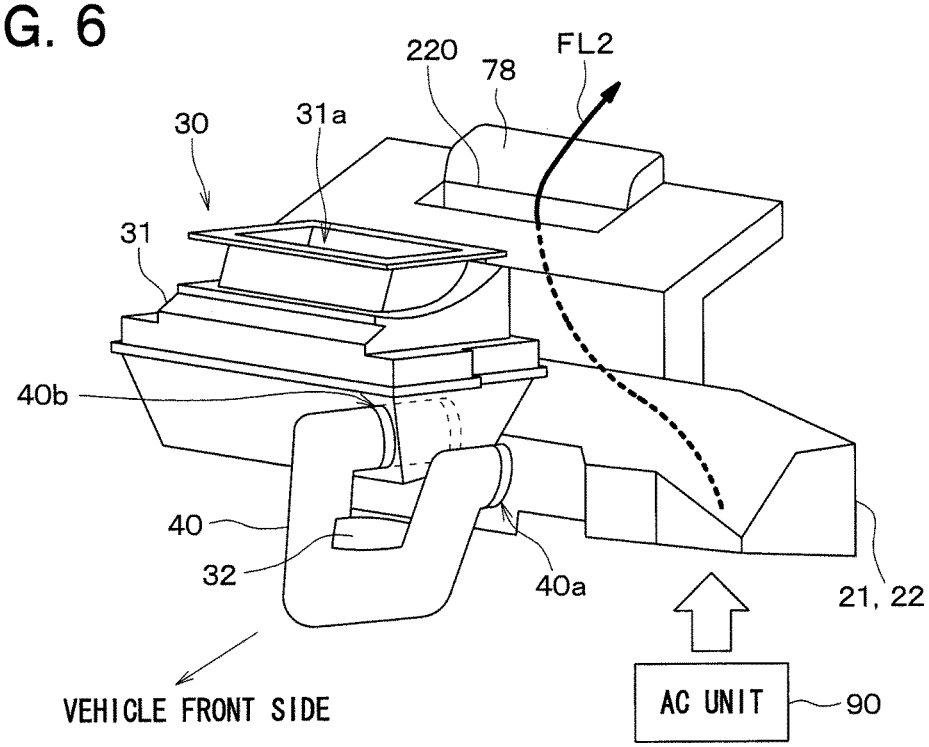
FIG. 6 is a diagram showing the head-up display device, a housing case and an air discharging device according to the first embodiment of the present disclosure.

Furthermore, as shown in FIG. 6, an opening portion 31a, through which the display image is projected, is formed at a top surface of the casing 31.

The housing case 40 is placed at the inside of the instrument panel 70 of the vehicle at a location that is on the vehicle front side of the second duct 22 of the air discharging device 10. The housing case 40 is configured such that a portion of the air, which flows in the inside of the second duct 22, is bypassed through the housing case 40 to cool the control board 33a, which has the control circuit 33 for controlling the display unit 32, as well as the heat sink fins 34.

Figure 7:
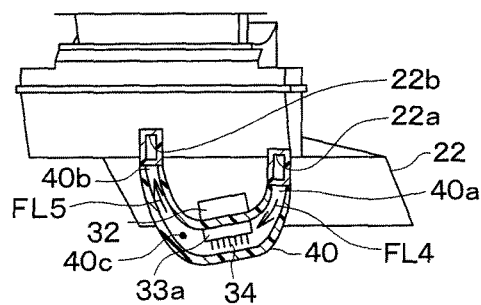
FIG. 7 is a schematic cross sectional view of the housing case of the head-up display device of FIG. 1.

As shown in FIG. 7, the housing case 40 has a hollow space 40c that is in contact with the control board 33a. In the present embodiment, the hollow space 40c is a space that receives the control board 33a, which has the control circuit 33 that controls the display unit 32.

Furthermore, the housing case 40 includes a communication passage 40a and a communication passage 40b. The communication passage 40a introduces the air, which flows in the second duct 22, from an opening portion 22a of the second duct 22 to the hollow space 40c, and the communication passage 40b introduces the air, which is in the hollow space 40c, to the second duct 22.

Furthermore, as shown in FIG. 5, two opening portions 22a, 22b are formed at a side surface of the second duct 22 located on the vehicle front side. The opening portion 22b is located on the downstream side of the opening portion 22a in the flow direction of the air. One end of the communication passage 40a is fitted to the opening portion 22a of the second duct 22, and one end of the communication passage 40b is fitted to the opening portion 22b.

FIG. 7 is a schematic cross sectional view of the housing case 40. As indicated by an arrow FL4 in FIG. 7, a portion of the air, which flows in the second duct 22, is introduced to the hollow space 40c of the housing case 40 through the communication passage 40a and cools the control board 33a and the heat sink fins 34. Furthermore, the air, which is introduced to the hollow space 40c of the housing case 40, is introduced to the second duct 22 through the communication passage 40b, as indicated by an arrow FL5 in FIG. 7.

When an ignition switch of the vehicle is turned on and is held in an ON state, the head-up display device 30 is placed into an operating state. Thereby, the control circuit 33 outputs the information, which indicates the display image to be projected to the windshield 5, to the display unit 32. The display unit 32 projects the display image based on the information inputted from the control circuit 33. The driver recognizes the image such that the image is displayed on the front side of the front glass 5.

The air is introduced from the air conditioning unit 90 to the first duct 21 and the second duct 22 in response to the operation of the occupant. For example, at the time of ventilating the air, the air, which is introduced by the air conditioning unit 90, is introduced to the first duct 21 and the second duct 22. At this time, a portion of the air, which flows in the second duct 22, is introduced to the hollow space 40c of the housing case 40 through the communication passage 40a, and the control board 33a and the heat sink fins 34 are cooled by the air, which is introduced to the hollow space 40c. Furthermore, the air, which is introduced to the inside of the housing case 40, is introduced to the second duct 22 through the communication passage 40b.

Also, for example, under the high temperature environment, such as under the blazing sun of the summer, the air, which is cooled by the heat exchanger, is introduced to the first duct 21 and the second duct 22. At this time, a portion of the air, which flows in the second duct 22, is introduced to the hollow space 40c of the housing case 40 through the communication passage 40a, and the control board 33a and the display unit 32 are cooled by this air. Thereby, the display image, which has the high brightness, can be immediately displayed at the head-up display device 30 of the present embodiment.

Furthermore, in a case where the cooling air is directly applied to the display unit 32, it is conceivable that the dust adheres to the display unit 32. However, in the head-up display device 30 of the present embodiment, the cooling air is not directly applied to the display unit 32. Therefore, it is possible to avoid the adhesion of the dust to the display unit 32 caused by the cooling air.

As discussed above, the head-up display device 30 of the present embodiment includes the display unit 32, the control board 33a and the housing case 40 while the housing case 40 has the hollow space 40c that is in contact with the control board 33a. The housing case 40 includes the communication passages 40a, 40b that communicate between the duct 22 and the hollow space 40c while the duct 22 conducts the air to be blown from the air conditioning device 90 of the vehicle to the vehicle cabin. Therefore, at the head-up display device 30 of the present embodiment, the control circuit 33, which controls the display unit 32, can be cooled without providing the cooling fan. Furthermore, at the head-up display device 30 of the present embodiment, the display unit 32 is placed at the outside of the housing case 40, and thereby a possibility of projecting an image of the dust over the display image can be reduced.

Additionally, since the display unit 32 is placed at the outer peripheral surface of the housing case 40, the display unit 32 can be cooled through heat conduction by the air that flows in the inside of the housing case 40.

Also, the communication passages 40a, 40b are constructed to communicate between the second duct and the hollow space 40c while the second duct conducts the air that is cooled by the air conditioning device 90. Therefore, under the high temperature environment, such as under the blazing sun of the summer, the air, which is cooled by the air conditioning device 90, is introduced to the hollow space 40c of the housing case 40, and thereby the control board 33a and the air conditioning device 90 can be cooled by this cooled air.

Figure 8:
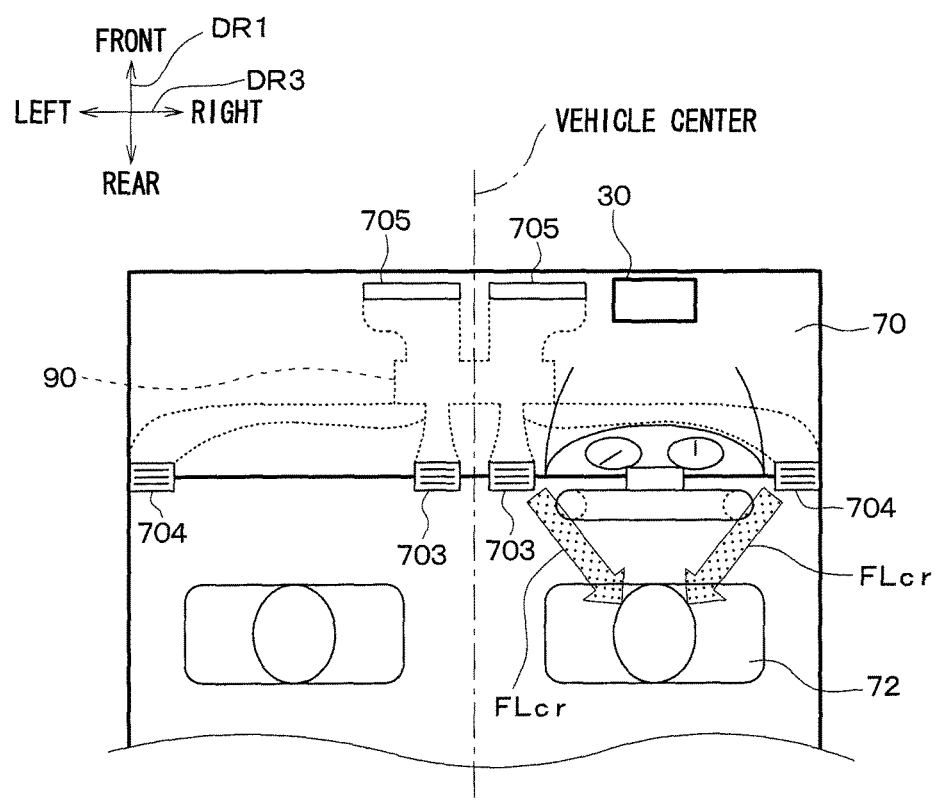
FIG. 8 is a schematic diagram showing a vehicle front side portion of a vehicle cabin seen from a top side of a vehicle in a comparative example of the air discharging device.

Furthermore, as in a case of a comparative example shown in FIG. 8, in an ordinary air conditioning unit of a vehicle, air, which is discharged from a center face opening 703 and a side face opening 704, which are air discharge outlet openings, is blown to a driver 72, as indicated by arrows FLcr. Furthermore, warm air is discharged from a defroster opening 705. Therefore, in the comparative example of FIG. 8, in order to cool the control board 33a of the head-up display device 30 by the air, which is cooled by the air conditioning unit 90, a long duct, which guides the air cooled by the air conditioning unit 90 to the control board 33a, is required.

In contrast, according to the present embodiment, as shown in FIG. 4, the housing case 40 of the head-up display device 30 is placed in the inside of the instrument panel 70 of the vehicle. Furthermore, the second duct 22 is a duct that guides the air to the discharge outlet 220, which opens upward at the top surface of the instrument panel 70 of the vehicle. Specifically, in the present embodiment, the second duct 22, which guides the air to the second discharge outlet 220 that discharges the air cooled by the air conditioning unit 90, is placed at the location that is immediately adjacent to the housing case 40 of the head-up display device 30. Therefore, in the present embodiment, the size of the housing case 40 can be reduced, and the costs can be reduced.

As discussed above, the head-up display device 30 of the present embodiment includes the communication passage 40a and the communication passage 40b. The communication passage 40a introduces the air, which flows in the second duct 22, to the hollow space 40c through the opening portion 22a of the second duct 22, and the communication passage 40b introduces the air, which is in the hollow space 40c, to the second duct 22. That is, as shown in FIG. 7, the head-up display device 30 of the present embodiment includes the two communication passages 40a, 40b that are communicated with the second duct 22 and the hollow space 40c. Specifically, the head-up display device 30 of the present embodiment includes the opening portion 22b, which is different from the opening portion 22a, at the second duct 22, and the head-up display device 30 also includes the communication passage 40a, which is communicated with the opening portion 22a, and the communication passage 40b, which is communicated with the opening portion 22b that is different from the opening portion 22a. In the head-up display device 30 of the present embodiment, in the case where the air, which flows in the second duct 22, is defined as a main flow, a small flow quantity of branched flow, which is a portion of this main flow, flows from the opening portion 22a of the second duct 22 into the communication passage 40a and passes through the hollow space 40c. This branched flow is discharged from the opening portion 22b to the second duct 22. As discussed above, in the head-up display device 30 of the present embodiment, the branched flow, which has the small flow quantity that is smaller than that of the main flow conducted in the second duct 22, is passed through the hollow space 40c and is applied to the control board 33a.

Here, in the head-up display device 30, when the main flow, which flows in the second duct 22, is directly applied to the control board 33a, a disadvantage, such as damaging of the control board 33a, will most likely happen. However, in the head-up display device 30 of the present embodiment, as discussed above, the branched flow, which has the small flow quantity that is smaller than that of the main flow conducted in the second duct 22, is applied to the control board 33a, so that the control board 33a can be cooled without causing the disadvantage, which would occur in the case of directly applying the main flow to the control board 33a.

In the head-up display device 30 of the present embodiment, besides the above two communication passages 40a, 40b, another communication passage, which communicates between the second duct 22 and the hollow space 40c, may be provided. Specifically, another opening portion, which is communicated with the second duct 22 and is different from the opening portions 22a, 22b, may be formed.

Second Embodiment

A second embodiment of the present disclosure will be described with reference to FIG. 10. The present embodiment is a modification of the first embodiment, in which the arrangement of the control board 33a is modified from that of the first embodiment, and the rest of the structure of the present embodiment is the same as that of the first embodiment and thereby will not be described here for the sake of simplicity.

At the head-up display device 30 of the first embodiment, the housing case 40 receives the control board 33a and has the hollow space 40c that is in contact with the control board 33a. Specifically, in the first embodiment, the control board 33a is received in the hollow space 40c.

Figure 10:
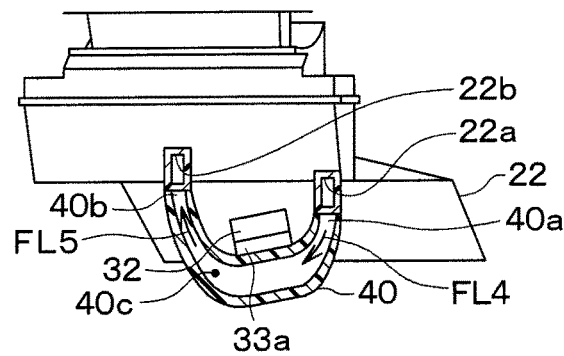
FIG. 10 is a view corresponding to FIG. 7 of the first embodiment, showing a second embodiment of the present disclosure.

In contrast, at the head-up display device 30 of the present embodiment, as shown in FIG. 10, the control board 33a is placed such that the control board 33a contacts the housing case 40 at the outside of the housing case 40. Specifically, the control board 33a contacts an opposite surface of the housing case 40, which is opposite from the hollow space 40c.

Therefore, even at the head-up display device 30 of the present embodiment, the housing case 40 includes the two communication passages 40a, 40b, which communicate between the duct 22 and the hollow space 40c while the duct 22 conducts the air to be blown from the air conditioning device 90 of the vehicle to the vehicle cabin. Therefore, the control circuit 33, which controls the display unit 32, can be cooled without providing the cooling fan. Furthermore, since the display unit 32 is placed at the outside of the housing case 40, it is possible to reduce the possibility of projecting the image of the dust over the display image.

(Modification)

Figure 11:
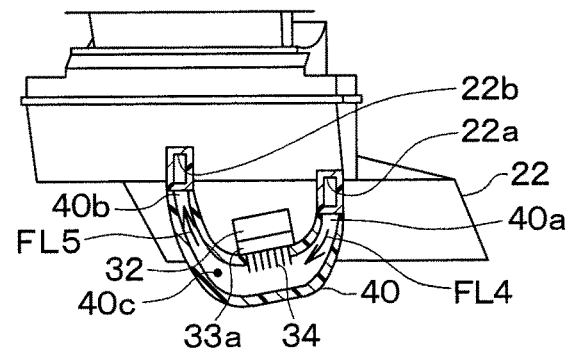
FIG. 11 is a view corresponding to FIG. 7 of the first embodiment, showing a modification of the second embodiment of the present disclosure.

As a modification of the above embodiment, as shown in FIG. 11, at the head-up display device 30, the heat sink fins 34 may be placed such that the heat sink fins 34 contact the hollow space 40c. Specifically, for example, as shown in FIG. 11, a through-hole, which communicates between the outside of the housing case 40 and the hollow space 40c, may be formed in the housing case 40, and the heat sink fins 34 may be extended through this through-hole, and thereby the heat sink fins 34 are in contact with the hollow space 40c. In this case, the control circuit 33 can be more effectively cooled.

Other Embodiments

The present disclosure should not be limited to the above embodiments and may be implemented in various other forms according to the principle of the present disclosure.

Figure 12:
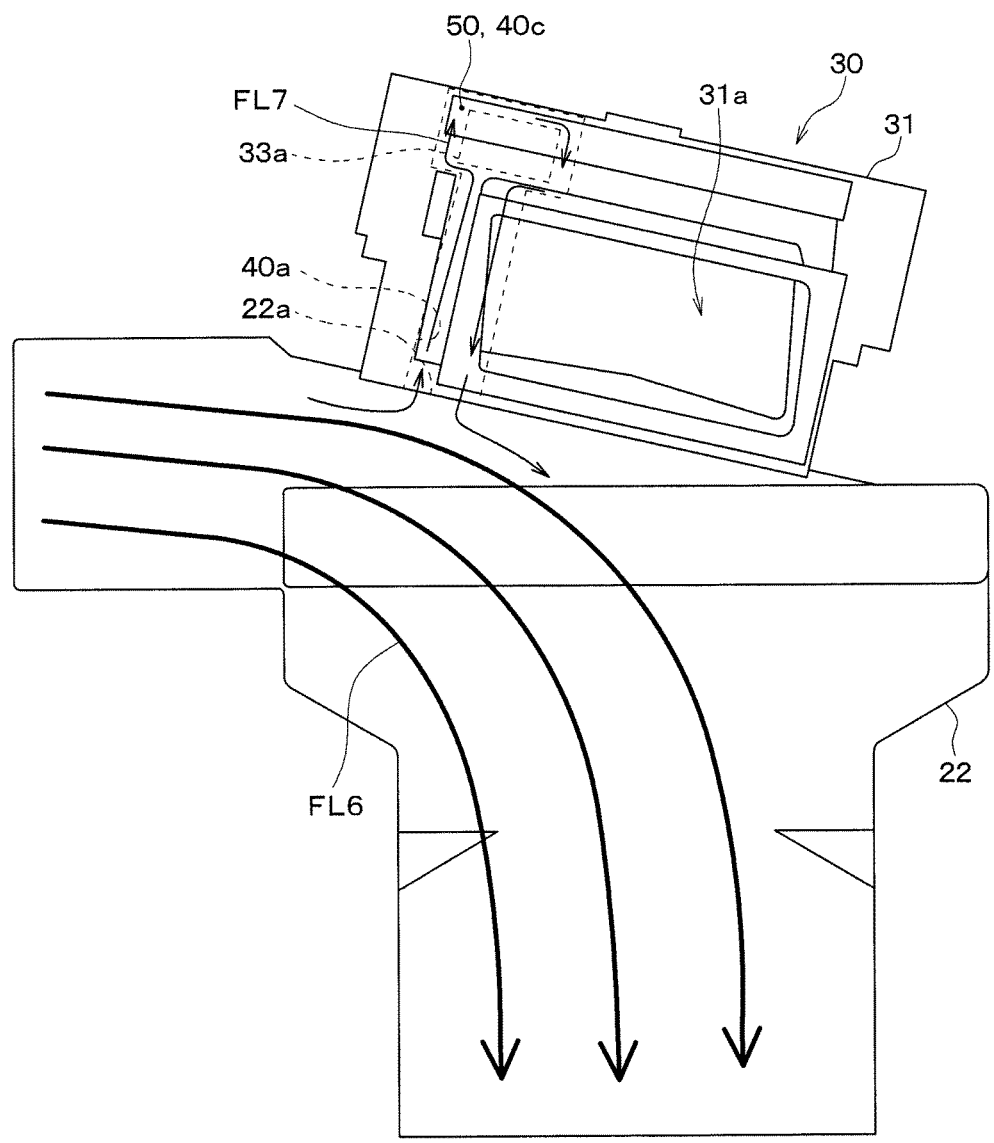
FIG. 12 is a diagram showing a peripheral area around a communication passage of a head-up display device seen from a top side of a vehicle according to another embodiment of the present disclosure.

(1) The housing case 40 of the above embodiments includes the communication passage 40a and the communication passage 40b while the communication passage 40a introduces the air, which flows in the second duct 22, from the opening portion 22a of the second duct 22 to the hollow space 40c, and the communication passage 40b introduces the air, which is in the hollow space 40c, to the second duct 22. However, in the above embodiments, these communication passages, which communicate between the second duct 22 and the housing case 40, may be changed to a single communication passage or may be changed to three or more communication passages. Specifically, as shown in FIG. 12, in the above embodiments, while the opening portion 22a and the communication passage 40a are left to remain there, the communication passage 40b and the opening portion 22b may be eliminated. As in this case where the number of the communication passages is reduced to one, the opening portion 22a of the communication passage 40a serves as both of an inlet and an outlet of the air to the hollow space 40c of the housing case 40. Thus, in this case, the structure of the head-up display device 30 can be simplified. In this case, as shown in FIG. 12, a passage 50 may be formed between the housing case 40 and the control board 33a in the hollow space 40c. Specifically, the blown air FL6 of the second duct 22, which is introduced to the communication passage 40a, may be conducted around the control board 33a, as indicated by a reference sign FL7, and may be returned to the communication passage 40a. In this case, the control board 33a can be effectively cooled.

Figure 9:
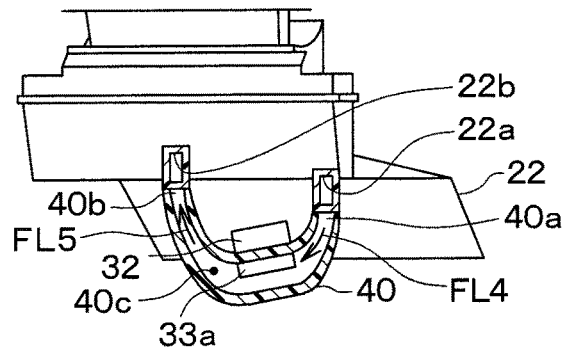
FIG. 9 is a schematic cross sectional view of a housing case of a head-up display device in a modification of the first embodiment.

(2) In the above embodiment, the cooling fins 34 for cooling the control board 33a, i.e., the heat sink fins 34 are provided. However, as shown in FIG. 9, the cooling fins 34, i.e., the heat sink fins 34 may be eliminated in the above embodiment. Even in this case, the control board 33a is cooled by the air, which flows in the housing case 40.

(3) In the above embodiments, the display unit 32 is formed by the liquid crystal display device that includes the liquid crystal display element. Alternatively, the display unit 32 may be formed by another type of member, such as a vacuum fluorescent display device, which is other than the liquid crystal display device.

(4) In the above embodiments, the hollow space 40c of the housing case 40 and the second duct 22 are communicated with each other. Alternatively, in the above embodiments, the hollow space 40c of the housing case 40 may be communicated with the first duct 21, or the duct, which conducts the air to be blown to the defroster opening 705 of FIG. 8 provided in the previously proposed vehicle, may be communicated with the hollow space 40c.

(5) In the above embodiments, the housing case 40 and the second duct 22 are formed separately from each other. Alternatively, in the above embodiments, the housing case 40 and the second duct 22 may be molded integrally as a one-piece body. Also, in the above embodiments, the housing case 40, the first duct 21 and the second duct 22 may be molded integrally as a one-piece body. Specifically, in the above embodiments, the housing case 40 and the second duct 22 may be formed integrally as the one-piece body. Also, the housing case 40, the first duct 21 and the second duct 22 may be formed integrally as the one-piece body.

Figure 13:
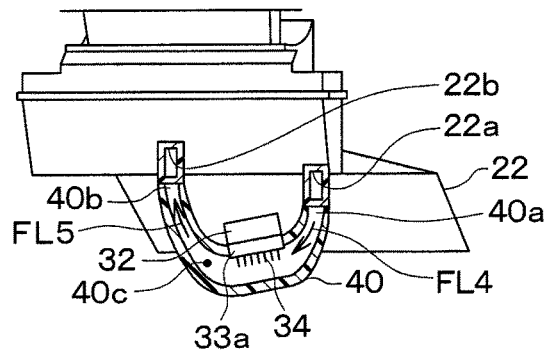
FIG. 13 is a view corresponding to FIG. 7 of the first embodiment, showing another embodiment of the present disclosure.

(6) In the first embodiment described above, the housing case 40 receives the control board 33a and has the hollow space 40c, which is in contact with the control board 33a. Specifically, the control board 33a is received in the hollow space 40c. Here, the control board 33a is not necessarily entirely received in the hollow space 40c. That is, for example, as shown in FIG. 13, in the first embodiment, a through-hole may be formed at the housing case 40, and the control board 33a may be inserted into this through-hole such that only a portion of the control board 33a is in contact with the hollow space 40c. In this case, this portion of the control board 33a is placed to be in contact with the hollow space 40c and is thereby cooled at the hollow space 40c, so that the control board 33a is cooled.

Figure 14:
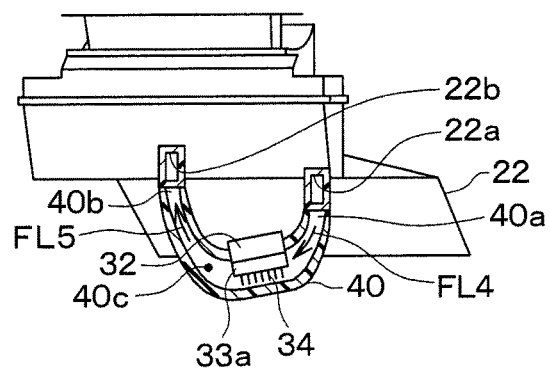
FIG. 14 is a view corresponding to FIG. 7 of the first embodiment, showing another embodiment of the present disclosure.

(7) In the above embodiments, the display unit 32 is placed at the outside of the housing case 40. Here, in the above embodiments, the entire display unit 32 is not necessarily placed at the outside of the housing case 40, and a portion of the display unit 32 may be placed at the outside of the housing case 40. For example, as shown in FIG. 14, one portion of the display unit 32 may be placed at the outside of the housing case 40, and another portion of the display unit 32, which is other than the one portion of the display unit 32, may be placed in the inside of the housing case 40, i.e., the hollow space 40c. Even in such a case, it is possible to reduce the possibility of projecting the image of the dust over the display image with respect to the one portion of the display unit 32, which is placed at the outside of the housing case 40.

Figure 15:
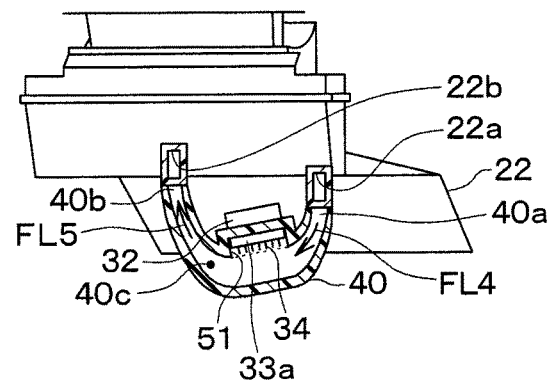
FIG. 15 is a view corresponding to FIG. 7 of the first embodiment, showing another embodiment of the present disclosure.

(8) In the first embodiment, as shown in FIG. 15, a recess 51, which is recessed in a direction perpendicular to a direction that is directed from the communication passage 40a to the communication passage 40b, may be formed, and the control board 33a may be placed in this recess 51. The communication passage 40a is a passage that introduces the air, which flows in the second duct 22, from the opening portion 22a of the second duct 22 to the hollow space 40c. The communication passage 40b is a passage that introduces the air, which is in the hollow space 40c, to the second duct 22. Even in the case where the control board 33a is placed in this manner, since the control board 33a is in contact with the hollow space 40c, the control board 33a can be cooled. Furthermore, since the control board 33a is placed in the inside of the recess 51, the air, which flows through the communication passage 40a, the hollow space 40c and the communication passage 40b in this order, does not directly contact the control board 33a. Therefore, it is possible to reduce a possibility of occurrence of a disadvantage, which would be caused by the this air flow.

The present disclosure should not be limited to the above embodiments. The above embodiments are not unrelated to each other, and the above-described features of the above embodiments may be combined in various ways in an appropriate manner unless such a combination is obviously impossible. Furthermore, in the above respective embodiments, it should be understood that the components are not necessarily indispensable except a case where the components are expressly stated as indispensable and a case where the components are regarded as indispensable in view of the principle. Furthermore, in the above respective embodiments, in the case where the number of the component(s), the value, the amount, the range, and/or the like is specified, the present disclosure is not limited to the number of the component(s), the value, the amount, and/or the like specified in the embodiment unless the number of the component(s), the value, the amount, and/or the like is indicated as indispensable or is obviously indispensable in view of the principle of the present disclosure. Furthermore, in the above respective embodiments, in the case where the material, the shape, the positional relationship and/or the like of the constituent component(s) is described, the present disclosure is not limited to the material, the shape, the positional relationship and/or the like of the constituent component(s) unless the material, the shape, the positional relationship and/or the like of the constituent component(s) is indicated as indispensable or is obviously indispensable in view of the principle of the present disclosure.

What is claimed is:

1. A head-up display device comprising:
a display unit that projects a display image to a windshield of a vehicle;
a control board that has a control circuit, which controls the display unit; and
a housing case that receives the control board and has a hollow space, which is in contact with the control board, wherein:
the display unit is placed at an outside of the housing case; and
the housing case includes a communication passage that communicates between:

a duct that conducts air, which is blown from an air conditioning device of the vehicle toward a vehicle cabin; and the hollow space.

2. The head-up display device according to claim 1, wherein the housing case includes the communication passage as:

a single communication passage; or one or a plurality of communication passages.

3. The head-up display device according to claim 1, wherein the housing case is formed integrally with the duct as a one-piece body.

4. The head-up display device according to claim 1, wherein the display unit is placed at an outer peripheral surface of the housing case.

5. The head-up display device according to claim 1, wherein the duct conducts the air that is cooled by the air conditioning device.

6. The head-up display device according to claim 5, wherein:

the housing case is placed in an inside of an instrument panel of the vehicle; and the duct is a duct that conducts the air to a discharge output, which opens upward at a top surface of the instrument panel of the vehicle.

7. A head-up display device comprising:

a display unit that projects a display image to a windshield of a vehicle;

a control board that has a control circuit, which controls the display unit; and a housing case that has a hollow space, which is in contact with the control board, wherein:

the display unit is placed at an outside of the housing case; and the housing case includes a communication passage that communicates between:

a duct that conducts air, which is blown from an air conditioning device of the vehicle toward a vehicle cabin; and the hollow space.

8. The head-up display device according to claim 7, wherein the housing case includes the communication passage as:

a single communication passage; or one or a plurality of communication passages.

9. The head-up display device according to claim 7, wherein the housing case is formed integrally with the duct as a one-piece body.

10. The head-up display device according to claim 7, wherein the display unit is placed at an outer peripheral surface of the housing case.

11. The head-up display device according to claim 7, wherein the duct conducts the air that is cooled by the air conditioning device.

12. The head-up display device according to claim 11, wherein:

the housing case is placed in an inside of an instrument panel of the vehicle; and the duct is a duct that conducts the air to a discharge output, which opens upward at a top surface of the instrument panel of the vehicle.

13. A head-up display device comprising:

a display unit that projects a display image to a windshield of a vehicle;

a control board that has a control circuit, which controls the display unit; and a housing case that has a hollow space, which is in contact with the control board, wherein:

the display unit is placed at an outside of the housing case;

the control board is placed such that the control board contacts the housing case at the outside of the housing case; and the housing case includes a communication passage that communicates between:

a duct that conducts air, which is blown from an air conditioning device of the vehicle toward a vehicle cabin; and the hollow space.

14. The head-up display device according to claim 13, wherein the housing case includes the communication passage as:

a single communication passage; or one or a plurality of communication passages.

15. The head-up display device according to claim 13, wherein the housing case is formed integrally with the duct as a one-piece body.

16. The head-up display device according to claim 13, wherein the display unit is placed at an outer peripheral surface of the housing case.

17. The head-up display device according to claim 13, wherein the duct conducts the air that is cooled by the air conditioning device.

18. The head-up display device according to claim 17, wherein:

the housing case is placed in an inside of an instrument panel of the vehicle; and the duct is a duct that conducts the air to a discharge output, which opens upward at a top surface of the instrument panel of the vehicle.

* * * * *